(12) United States Patent
    Attia

(10) Patent No.: US 10,900,603 B2
(45) Date of Patent: Jan. 26, 2021

(54) DEVICE FOR PREVENTING REFRIGERANT LEAKS IN AIR CONDITIONING SYSTEM SERVICE PORTS

(71) Applicants: Shlomo Attia, Dania Beach, FL (US); Mikhail Viehmeyer, Velrico, FL (US)

(72) Inventor: Shlomo Attia, Dania Beach, FL (US)

(73) Assignees: Shlomo Attia, Dania Beach, FL (US); Mikhail Viehmever, Velrico, FL (US)

( * ) Notice: Subject to any disclaimer, the term of this patent is extended or adjusted under 35 U.S.C. 154(b) by 0 days.

(21) Appl. No.: 16/574,870

(22) Filed: Sep. 18, 2019

(65) Prior Publication Data
US 2020/0011469 A1    Jan. 9, 2020

Related U.S. Application Data

(63) Continuation-in-part of application No. 15/850,991, filed on Dec. 21, 2017, now Pat. No. 10,458,590.

(51) Int. Cl.
    *F16L 55/10*     (2006.01)
    *F16L 55/115*    (2006.01)
    *F25B 41/00*     (2006.01)

(52) U.S. Cl.
    CPC ....... *F16L 55/1152* (2013.01); *F16L 55/1157* (2013.01); *F25B 41/003* (2013.01); *F25B 2500/221* (2013.01)

(58) Field of Classification Search
    CPC ... B25B 13/48; B25B 27/24; F25B 2345/006; F25B 2500/22; F25B 41/003; F16L 37/34; F16L 37/36; F16L 37/413; F16L 37/44; Y10T 137/87973; Y10T 137/87965
    USPC .... 138/89; 137/614.02, 614.04–614.06, 322; 251/149.1, 149.6, 148, 147
    See application file for complete search history.

(56) References Cited

U.S. PATENT DOCUMENTS 3,843,015 A ‡ 10/1974 Blau .................. F16J 13/12
                                                    220/28
3,985,007 A ‡ 10/1976 Gerdes ............... B06K 15/0409
                                                    70/172
4,716,938 A ‡ 1/1988 Weh ................... F16L 37/1215
                                                    137/614.06

(Continued)

FOREIGN PATENT DOCUMENTS

CN    202646736 U  ‡  1/2013
CN    202646736 U     1/2013

*Primary Examiner* — Patrick F Brinson
(74) *Attorney, Agent, or Firm* — Laurence A. Greenberg; Werner H. Stemer; Ralph E. Locher

(57) ABSTRACT

A device for preventing refrigerant leaks in air conditioning system service ports includes a quick coupler for engaging the service port. A main body is disposed adjacent the coupler. A stem is movable inside the main body and a first sealing element is adjacent the stem. A head which is fastened to the main body has an internal thread and a second sealing element is disposed within the head. A shaft has an external thread to be screwed into the internal thread of the head. The shaft has an end with a recess to be engaged by a tool and the shaft has a free end remote from the recess for contacting the second sealing element, for pushing the second sealing element against the stem and for pushing the first sealing element adjacent the stem against an end of the service port upon turning the shaft.

13 Claims, 8 Drawing Sheets

(56) References Cited

U.S. PATENT DOCUMENTS

| | | | | |
|---|---|---|---|---|
| 5,139,049 A | ‡ | 8/1992 | Jensen | F16L 37/34 137/614.03 |
| 5,240,023 A | ‡ | 8/1993 | Shelef | F16L 37/22 137/15.09 |
| 5,370,359 A | ‡ | 12/1994 | Sadegh | F16L 37/28 137/614.15 |
| 5,415,200 A | * | 5/1995 | Haunhorst | F16L 37/36 137/614.03 |
| 5,529,283 A | ‡ | 6/1996 | Knecht | F16K 31/50 251/147 |
| 5,586,748 A | ‡ | 12/1996 | Kish | F16L 37/36 137/614.04 |
| 5,623,959 A | ‡ | 4/1997 | Granmoe | B25B 13/48 137/322 |
| 5,709,243 A | ‡ | 1/1998 | Wells | F16L 37/23 137/614.01 |
| 6,675,833 B2 | ‡ | 1/2004 | Maldavs | F16L 37/23 137/614.03 |
| 7,237,760 B1 | ‡ | 7/2007 | Chiu | F16K 15/063 137/614.03 |
| 7,730,735 B2 | ‡ | 6/2010 | Maruya | F25B 45/00 137/454.2 |
| 8,118,186 B2 | ‡ | 2/2012 | Ehlers | F16L 55/1152 220/28 |
| 8,807,525 B2 | ‡ | 8/2014 | Chang | F16L 37/34 137/614.05 |
| 2014/0020781 A1 | ‡ | 1/2014 | Holt | F16L 55/1152 138/89 |
| 2014/0069133 A1 | ‡ | 3/2014 | Becker | B60H 1/00485 62/292 |
| 2014/0261807 A1 | ‡ | 9/2014 | Cooley | E02F 9/2275 137/614.01 |
| 2015/0184787 A1 | ‡ | 7/2015 | Rubin | F16L 55/1152 138/96 |

\* cited by examiner

‡ imported from a related application

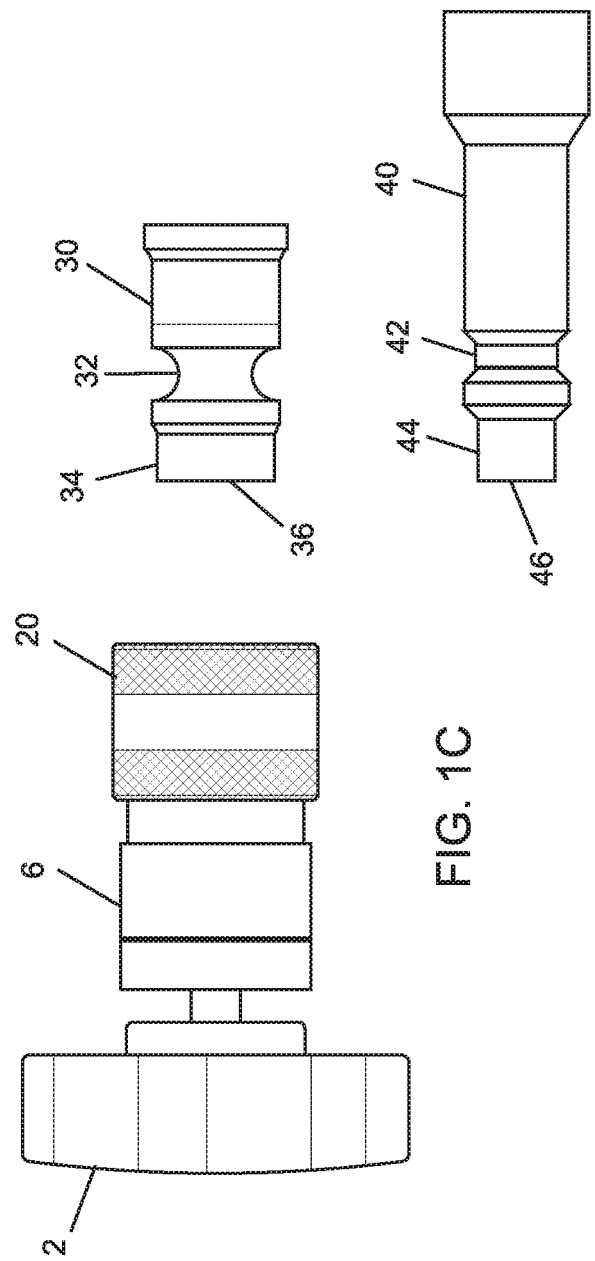

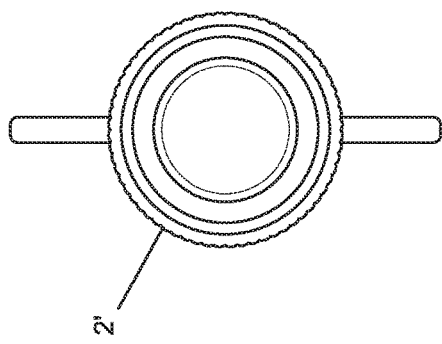
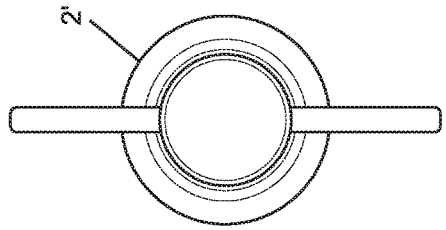
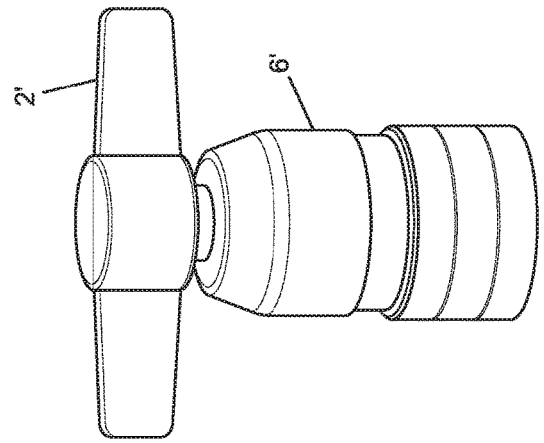
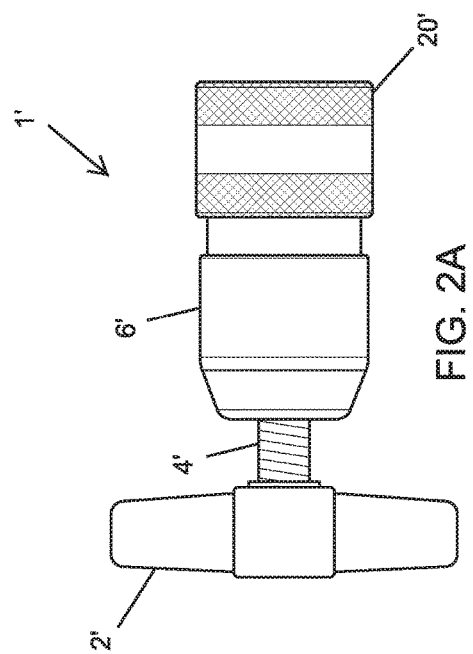

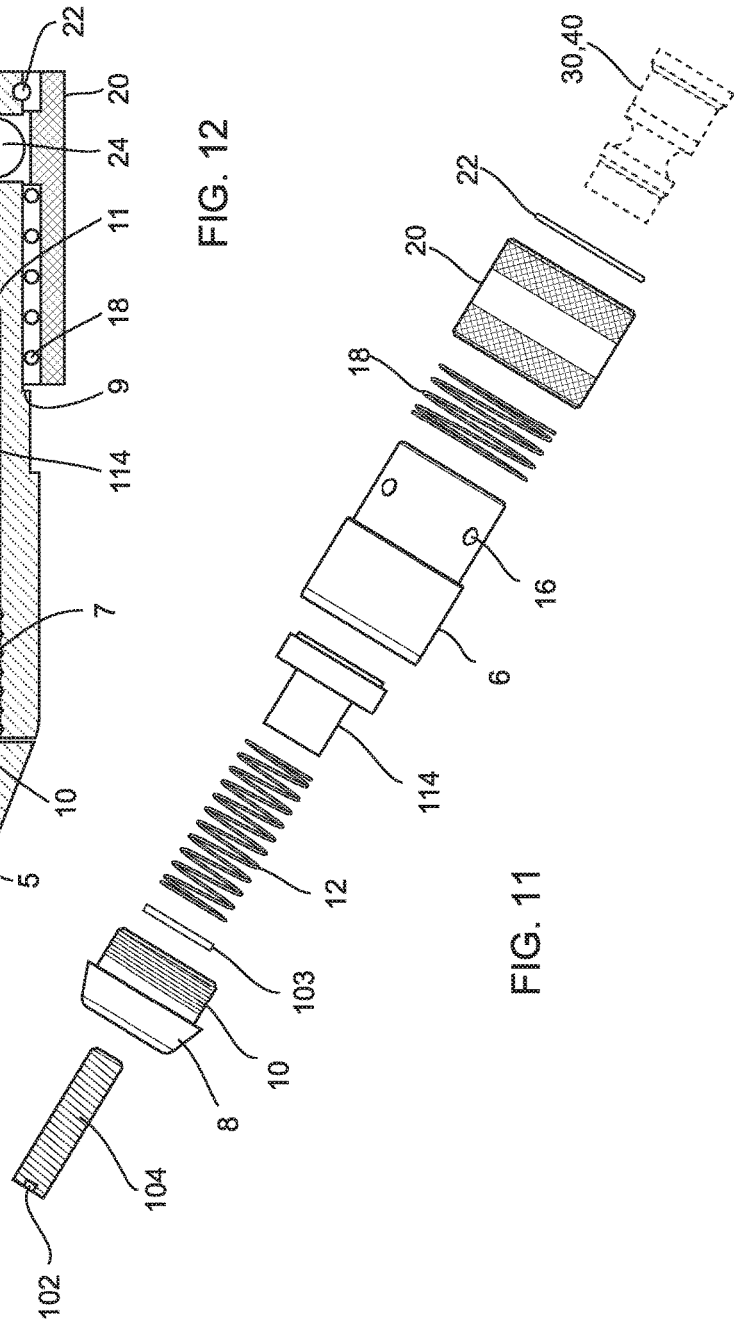
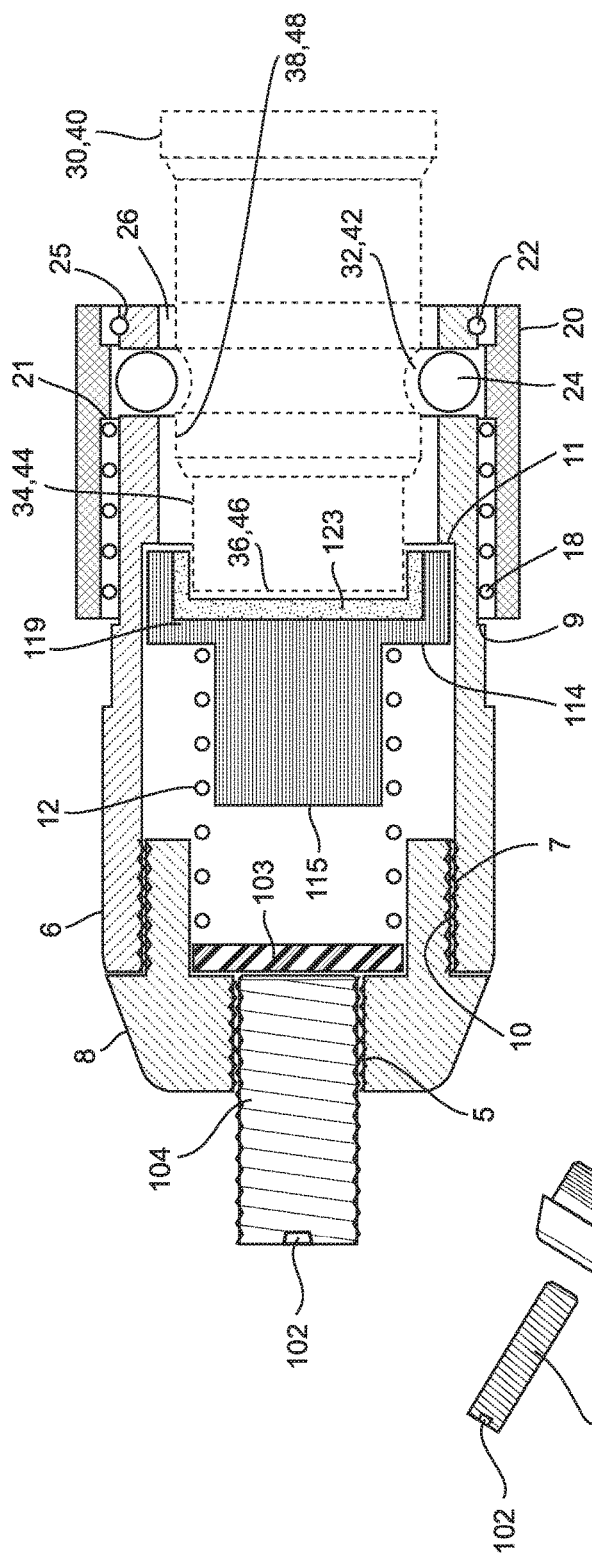

DEVICE FOR PREVENTING REFRIGERANT LEAKS IN AIR CONDITIONING SYSTEM SERVICE PORTS

CROSS-REFERENCE TO RELATED APPLICATION

This application is a Continuation-In-Part of U.S. application Ser. No. 15/850,991, filed Dec. 21, 2017; the prior application is herewith incorporated by reference in its entirety.

BACKGROUND OF THE INVENTION

Field of the Invention

The invention relates to a device for preventing service ports in air conditioning systems from leaking refrigerant.

The main components of an air conditioning system are a compressor, a condenser, an evaporator, an expansion valve, a dryer or accumulator and refrigerant lines interconnecting the main components. Two refrigerant lines which are attached to the compressor are metal tubes having different diameters. The smaller diameter tube is a so-called high-pressure line and the larger diameter tube is a so-called low-pressure line. Each line has a service port which is used to service the air conditioning system. The service ports are each equipped with a check valve which is intended to prevent refrigerant leaks.

However, due to age, damage or soiling, the ports may begin to leak, requiring the system to be charged with refrigerant. The service ports cannot be replaced alone and instead the entire line to which the port is attached must be replaced. The lines cost several hundred and often more than one thousand Dollars. Simple plastic caps may prevent soiling of the port, but cannot prevent leakage.

Description of the Related Art

U.S. Patent Publication 2015/0184787A1 discloses an apparatus for sealing a pipe, not a port, to prevent refrigerant leaks. A cap assembly is provided with a washer 106. U.S. Patent Publication 2014/0069133A1 relates to an AC service port cap 11 in which a rubber plug 31 is placed in a seat 28 of a top 21 of the cap 11. The lower face of the plug has a bulge which extends partly into the port. U.S. Patent Publication 2014/0020781A1 teaches a locking mechanism for refrigerant line caps in which a cover 15 with a key 13 is applied into a housing body 12 for sealing a fill valve 75. U.S. Pat. No. 8,118,186B2 discloses a ratchet assembly for preventing slippage of a cap 100 for a service port 14. U.S. Pat. No. 3,985,007 relates to a screw cap 2 having a cap portion 1 and an inset member 11. A sealing washer 18 is disposed between the cap and the inset member 11. U.S. Pat. No. 3,843,015 teaches another screw cap having a cap part 1 for a threaded cap port 2. The cap part 1 extends around an overlapping rim 1'. Chinese Patent CN202646736U discloses a taper washer between a horn mouth of a connection tube and a taper joint.

None of the prior art documents adequately prevent refrigerant leaks in service ports of air conditioning systems.

BRIEF SUMMARY OF THE INVENTION

It is accordingly an object of the invention to provide a device for preventing refrigerant leaks in air conditioning system service ports, which overcomes the above-mentioned disadvantages of the heretofore-known devices of this general type and which ensures that even a refrigerant line having an aged, damaged or soiled port will be adequately sealed without the need to replace the port and thus the line.

With the foregoing and other objects in view there is provided, in accordance with the invention, a device for preventing refrigerant leaks in air conditioning system service ports. The device comprises a coupler to be coupled to an air conditioning system service port, a main body having a longitudinal direction and being disposed adjacent the coupler in the longitudinal direction, a stem movable inside the main body in the longitudinal direction, a sealing element adjacent the stem, a head fastened to the main body, the head having an internal thread, and a handle having a shaft with an external thread to be screwed into the internal thread of the head. The shaft has a free end remote from the handle for contacting the stem and pushing the sealing element adjacent the stem against an end of the service port upon turning the handle.

The device makes it possible to tightly press the sealing element against the end of the service port so that even if the valve in the service port leaks, refrigerant cannot escape.

In accordance with another feature of the invention, the coupler is a quick coupler having a detent for engaging in a groove formed in the service port. The detent may include a plurality of locking balls. Quick couplers are currently used for equipment that services air conditioning systems. They allow the equipment to be easily and quickly attached to service ports.

In accordance with a further feature of the invention, the sealing element is a disk-shaped washer, and the stem has one opening facing the coupler and receiving the washer. The stem may have a T-shaped cross section and a further opening facing the handle and receiving the free end of the shaft. The further opening may have a smaller diameter than the one opening. A stem spring is disposed between the head and the stem. The stem is therefore biased against the service port until the handle is turned, adding more pressure.

In accordance with an added feature of the invention, the main body is partially disposed within the coupler, the main body has a shoulder, the coupler has a shoulder, and a coupler spring surrounds part of the main body and is biased between the shoulder of the coupler and the shoulder of the main body permitting the coupler to act as a quick coupler with the service port. Although this represents one type of quick coupler, other types may be used in the invention.

In accordance with an additional feature of the invention, at least one O-ring is engaged in a groove formed in the one opening of the stem for sealing against an outer surface of the service port. The O-ring or O-rings provide an additional sealing effect for the service port.

In accordance with yet another feature of the invention, the coupler has a color identifying the device for use only on a low-pressure or high-pressure service port. This feature provides easy identification of the proper device to place on a particular service port.

In accordance with yet a further feature of the invention, according to a second embodiment, the sealing element is a cup, and the stem has one opening facing the coupler and receiving the cup. Once again, the stem may have a T-shaped cross section and a further opening facing the handle and receiving the free end of the shaft, the further opening having a smaller diameter than the one opening. The cup, which may be formed of rubber, may provide a larger contact surface with the outer surface of the service port than the O-ring.

In accordance with yet an additional feature of the invention, the main body has an inner surface with a step formed therein defining a stop preventing the stem from sliding beyond a predetermined distance in the main body toward the port. Therefore, the stem will be located in the proper position between the stop and the stem spring.

In accordance with another feature of the invention, the head is screwed to the main body, although any other suitable connection is possible.

With the objects of the invention in view there is additionally provided a device for preventing refrigerant leaks in air conditioning system service ports, the device comprising a quick coupler having a detent for engaging in a groove formed in an air conditioning system service port, a main body having a longitudinal direction and being disposed adjacent the coupler in the longitudinal direction, a stem movable inside the main body in the longitudinal direction, a first sealing element adjacent the stem, a head fastened to the main body, the head having an internal thread, a second sealing element disposed within the head, and a shaft with an external thread to be screwed into the internal thread of the head, the shaft having an end with a recess to be engaged by a tool, the shaft having a free end remote from the recess for contacting the second sealing element, for pushing the second sealing element against the stem and for pushing the first sealing element adjacent the stem against an end of the service port upon turning the shaft.

In accordance with a concomitant feature of the invention, the end of the shaft having the recess is substantially flush with an end surface of the head when the shaft is sufficiently tightened to preventing refrigerant leaks. In this context, sufficiently flush means that the end of the shaft with the recess may protrude from or be recessed into the end surface of the head by no more than ½ of an inch.

The advantage of the shaft is that there is no handle protruding from the device when it is installed. This construction eliminates the possibility of someone accidentally turning the handle and of the handle being struck by a mechanic or interfering with other engine components in the engine compartment of a vehicle.

Other features which are considered as characteristic for the invention are set forth in the appended claims.

Although the invention is illustrated and described herein as embodied in a device for preventing refrigerant leaks in air conditioning system service ports, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE SEVERAL VIEWS OF THE DRAWING

FIGS. 1A, 1B and 1C are respective diagrammatic side-elevational, perspective and side-elevational exploded views of a first embodiment of a device according to the invention for use on a low-pressure port;

FIGS. 2A, 2B and 2C are views similar to FIGS. 1A, 1B and 1C of a device according to the invention for use on a high-pressure port;

FIGS. 8A and 8B are respective top-plan and bottom-plan views of the handle of FIGS. 2A-2C;

FIG. 11 is a view similar to FIG. 3 of a third embodiment of a device according to the invention for use on a low-pressure port; and FIG. 12 is a view similar to FIG. 5 of the third embodiment of the invention.

DETAILED DESCRIPTION OF THE INVENTION

Figure 7A:
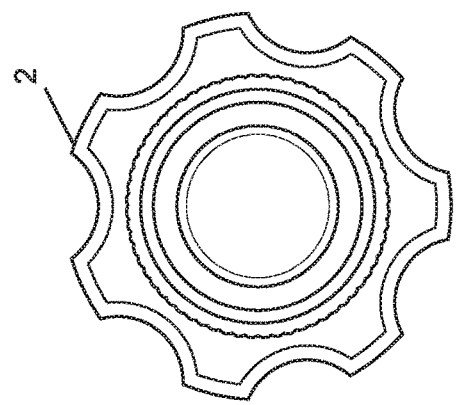
FIGS. 7A and 7B are respective top-plan and bottom-plan views of the handle of FIGS. 1A-1C.
Figure 7B:
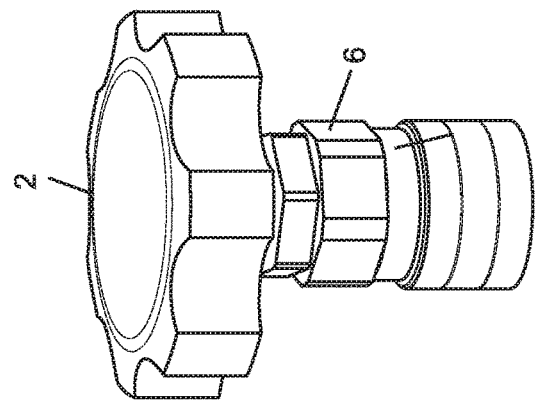
Figure 1A:
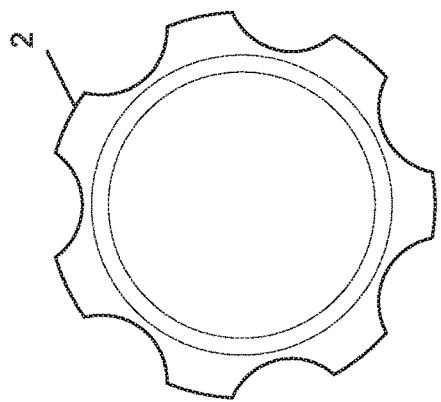
Figure 1B:
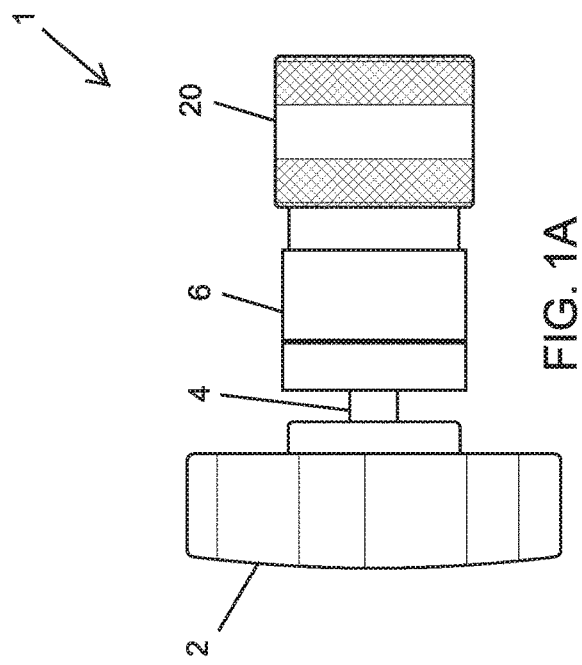
Figure 10C:
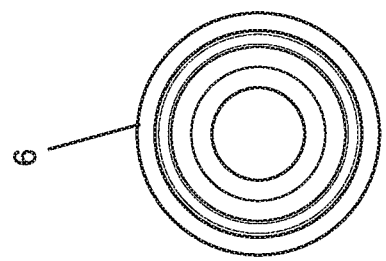
FIGS. 10A, 10b and 10C are respective top-plan, side-elevational and bottom-plan views of a main body of the device.
Figure 10B:
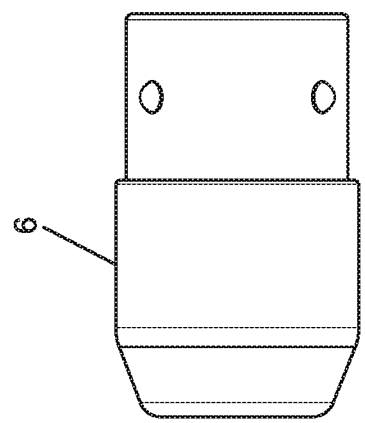
Figure 10A:
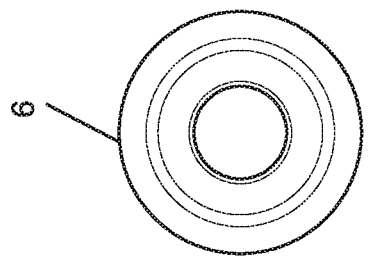

Referring now to the figures of the drawing in detail and first, particularly, to FIGS. 1A and 1B thereof, there is seen a device 1 for preventing refrigerant leaks in air conditioning system service ports. The device 1 includes a handle or cap 2 (also see FIGS. 7A and 7B) having a threaded shaft 4 extending into a main body 6 (also see FIGS. 10A-10C) attached to a coupler 20, which will be described in detail below. FIG. 1C shows the handle 2 and the main body 6 as well as two ports 30, 40 to which the device 1 is to be attached. The port 30 having the larger diameter is the low-pressure port and the port 40 having the smaller diameter is the high-pressure port. The ports 30, 40 are attached at their right side as shown in the figure to respective refrigerant lines. The ports 30, 40 each have a respective undercut or groove 32, 42 formed therein to which the device 1 is attached, a respective extension 34, 44 beyond the undercut or groove, a collar 38, 48 between the undercut or groove 32, 42 and the extension 34, 44 and a respective end 36, 46.

Figure 2C:
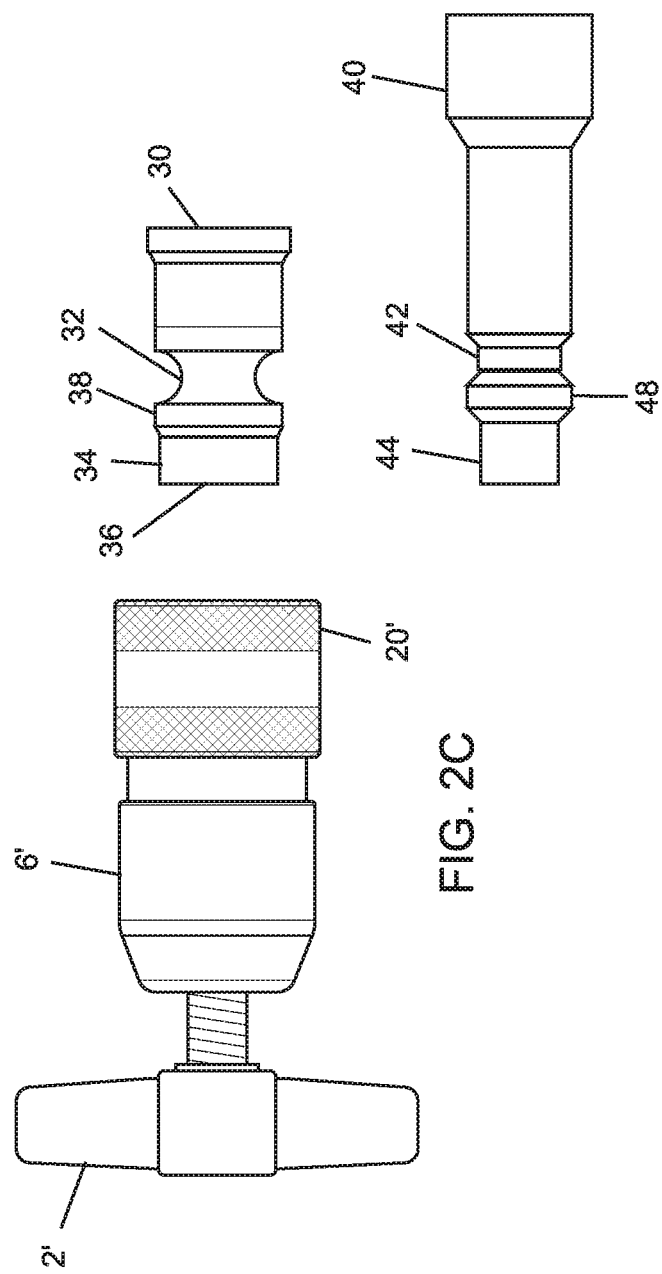

FIGS. 2A, 2B and 2C show a device 1' having a handle or cap 2' (also see FIGS. 8A and 8B) with a threaded shaft 4', a main body 6' and a coupler 20'. The device 1' is to be attached to a port 30, 40 in the same manner described above with regard to FIGS. 1A-1C. The difference between the devices 1 and 1' is that the handle 2 is round whereas the handle 2' is elongated making it easier to distinguish between the devices 1, 1'. The couplers 20, 20' are also provided in different colors. In particular, the coupler 20 on the device 1 for the low-pressure port 30 is blue whereas the coupler 20' on the device 1' for the high-pressure port 40 is red. The handles 2, 2' may also be made in different colors. One of the devices will be used for the high-pressure port and the other will be used for the low-pressure port and the shapes and colors of the couplers and handles will prevent the user form attempting to use the wrong device for a particular port. However, since the ports and therefore the main bodies have different diameters, it is not possible to actually attach a device to the wrong port.

Figure 3:
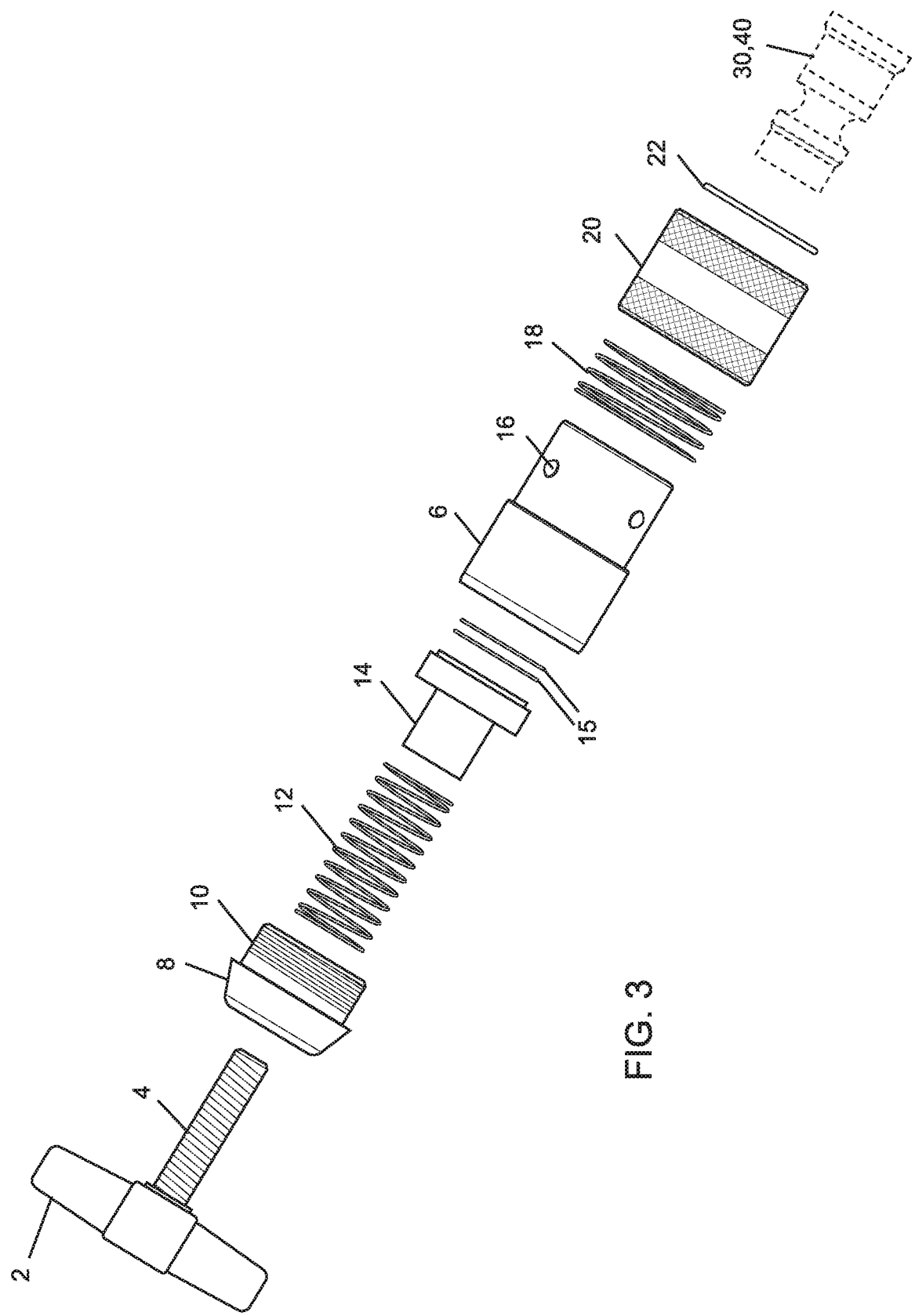
FIG. 3 is an exploded side-elevational view of the device of FIG. 2.
Figure 9C:
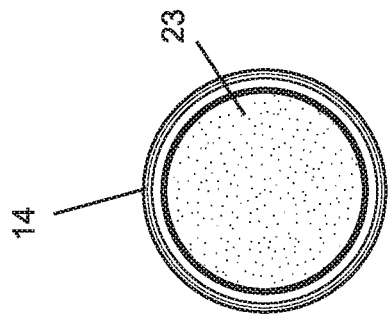
FIGS. 9A, 9b and 9C are respective top-plan, side-elevational and bottom-plan views of a stem of the device.
Figure 9B:
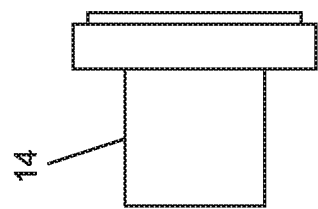
Figure 9A:
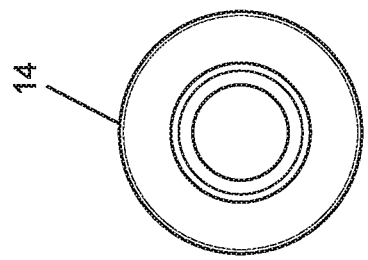

The exploded view of FIG. 3 shows the entire device 1 to be used on a port 30, 40. Although the device 1 will be described below, the explanations are the same for the device 1'. The handle 2 having the threaded shaft 4 is seen at the left side of the figure. The handle 2 is followed by a head 8 having an external thread 10, a stem spring 12, a stem 14 (also see FIGS. 9A-9C), two O-rings 15, the main body 6 having holes 16 for receiving locking balls, a coupler spring 18, a lock-release coupler 20 and a locking ring 22. The coupler 20 is a quick coupler which has been modified for use in the device according to the invention.

Figure 4:
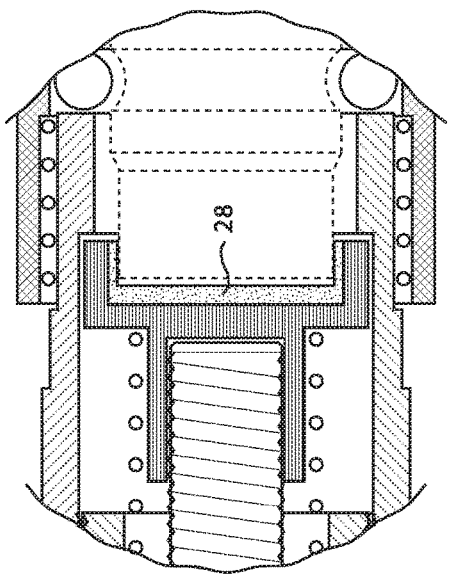
FIG. 4 is a view similar to FIG. 2A showing a center line V-V.
Figure 5:
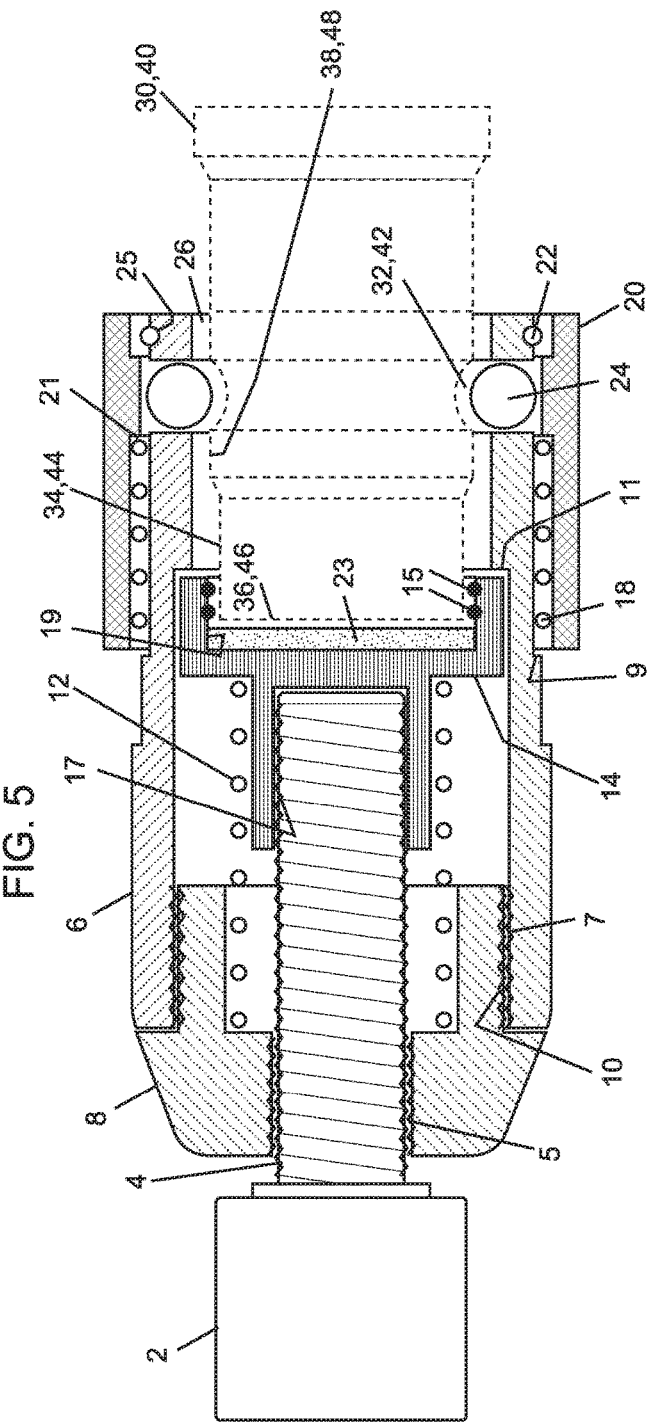
FIG. 5 is a longitudinal-sectional view taken along the line V-V in FIG. 4, in the direction of the arrows, using a washer and O-rings to seal the device against a port.

The assembled device 1 is shown in FIGS. 4 and 5. It may be seen therein that the external thread of the shaft 4 is screwed into an internal thread 5 of the head 8 and the external thread 10 of the head 8 is screwed into an internal thread 7 of the main body 6 while enclosing the stem 14 and biasing the stem spring 12 between the head 8 and the stem 14. The stem 14 is prevented from sliding too far toward the port 30, 40 in the longitudinal direction of the main body 6 by a stop 11, which is a step formed in the inner surface of the main body 6. The coupler spring 18 is biased between a shoulder 21 of the coupler 20 and a shoulder 9 of the main body 6. The two O-rings 15 are disposed in annular grooves formed in the stem 14, although one O-ring may be used. The O-rings 15 are sealed against the outer surface of the extension 34, 44 of the port 30, 40. The stem 14 has a T-shaped cross section defining a smaller opening 17 receiving the shaft 4 and a larger opening 19 receiving a disk-shaped washer or pad 23, which may be formed of Teflon® (polytetrafluroethylene or PTFE), nylon, rubber or any other material suitable for sealing the end 36, 46 of the port 30, 40. The holes 16 in the main body 6 are filled with locking balls 24 which are shown as being engaged in the undercut or groove 32, 42 of the port 30, 40. However, another type of detent other than locking balls may be used. Finally, the locking ring 22 is snapped into a groove 25 formed in the main body 6.

In order to attach the device 1 to the port 30, 40, the handle 2 is turned counter clockwise so that the shaft 4 is partially extracted from the head 8. The user can then place the handle 2 in the palm of one hand and grasp the lock-release coupler 20 between the thumb and index finger of the same hand. The user then pulls the coupler 20 toward the handle 2 against the force of the coupler spring 18 and inserts the end 36, 46 of the port 30, 40 into the open end 26 of the main body 6. Since the coupler 20 has been pulled toward the handle 2, the locking balls 24 are adjacent a wider diameter recess 27 of the main body 6 which allows the collar 38, 48 of the port 30, 40 to slide past the locking balls 24. The coupler 20 is then released and the coupler spring 18 pushes the coupler 20 away from the head 8 and locks the locking balls 24 in the undercut or groove 32, 42 of the port 30, 40. The O-rings 15 are simultaneously sealed against the outer surface of the extension 34, 44 of the port 30, 40.

The handle 2 is then turned in the clockwise direction causing the shaft 4 to be inserted father into the head 8 and to push the stem 14 so that the disk-shaped washer or pad 23 is pushed against the end 36, 46 of the port 30, 40. The port 30, 40 is locked in place by the locking balls 24 in the undercut or groove 32, 42 so that an air-tight and liquid-tight seal is established between the disk-shaped washer or pad 23 and the end 36, 46 of the port 30, 40. In order to release the port, the handle 2 is turned in the counter clockwise direction and the coupler 20 is retracted, freeing the port for removal.

Figure 6:
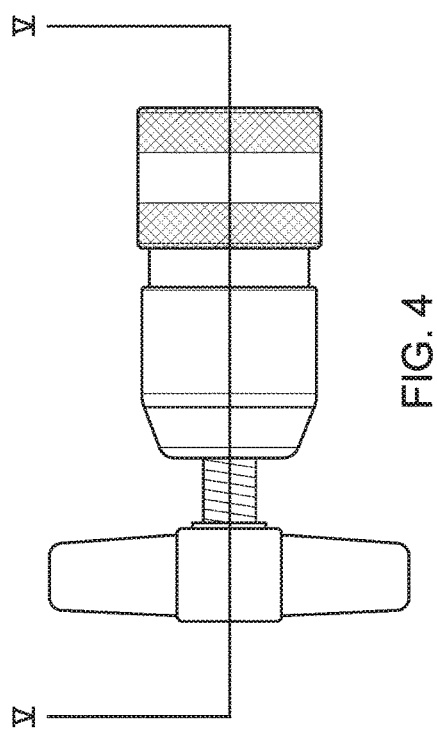
FIG. 6 is a fragmentary, longitudinal-sectional view of a second embodiment in which the washer and the O-rings are replaced by a cup.

In a second embodiment shown in FIG. 6, the disk-shaped washer or pad 23 and the O-rings 15 are replaced by a rubber cup 28 which sits inside the opening 19 and receives the end 36, 46 and the extension 34, 44 of the port 30, 40. The cup may also be formed of Teflon® or nylon or any other suitable sealing material.

In a third embodiment of the device shown in FIGS. 11 and 12, the handle 2 has been eliminated and the threaded shaft 4 has been replaced by a threaded shaft or Allen screw 104 provided with a recess 102 for an Allen wrench. The hollow stem 14 has been replaced by a solid stem 114. In addition, a sealing element in the form of a washer or pad 103, which may be formed of rubber, Teflon® or nylon or any other suitable sealing material, is disposed in the head 8 at the end of the spring 12. Finally, the disk-shaped washer or pad 23 has been replaced by a cup-shaped washer or pad 123 disposed in an opening 119 of the solid stem 114.

In order to establish an air-tight and liquid-tight seal between the washer or pad 123 and the end 36, 46 of the port 30, 40, the coupler 20 is pulled, the end 36, 46 of the port 30, 40 is inserted into the open end 26 of the main body 6 and the coupler 20 is released as in the first embodiment.

Then, an Allen wrench is used to rotate the threaded shaft or Allen screw 104 clockwise so that the washer or pad 103 is pushed against the end of the solid stem 114 while compressing the spring 12. The end of the screw 104 having the recess 102 will be approximately flush with the end of the head 8 when the washer or pad 103 is sufficiently tightened against a surface 115 of the solid stem 114. The port 30, 40 is locked in place by the locking balls 24 in the undercut or groove 32, 42 so that an air-tight and liquid-tight seal is established between the disk-shaped washer or pad 123 and the end 36, 46 of the port 30, 40.

In order to release the port, the threaded shaft or Allen screw 104 is turned in the counter clockwise direction and the coupler 20 is retracted, freeing the port for removal.

The shaft 104 may have a length permitting the end of the shaft 104 having the recess 102 to be substantially flush with an end surface of the head 8 when the shaft 104 is sufficiently tightened to prevent refrigerant leaks. This gives the mechanic an indication that the shaft has been inserted far enough into the head. Alternatively, the shaft may protrude from the head or it may be short enough that it is recessed within the head after it is sufficiently tightened.

The advantage of this embodiment is that even if the shaft protrudes from the head, there is no handle protruding from the device when it is installed. This eliminates the possibility of someone accidentally turning the handle or of the handle being struck by a tool or interfering with components in the engine compartment of a vehicle.

The sealing element 28 of FIG. 6 can be used in the stem 114 in same way as described above.

The invention claimed is:

1. A device for preventing refrigerant leaks in air conditioning system service ports, the device comprising:
    a quick coupler having a detent for engaging in a groove formed in an air conditioning system service port;
    a main body having a longitudinal direction and being disposed adjacent said coupler in said longitudinal direction;
    a stem movable inside said main body in said longitudinal direction;
    a first sealing element adjacent said stem;
    a head fastened to said main body, said head having an internal thread;
    a second sealing element disposed within said head; and
    a shaft with an external thread to be screwed into said internal thread of said head, said shaft having an end with a recess to be engaged by a tool, said shaft having a free end remote from said recess for contacting said second sealing element, for pushing said second sealing element against said stem and for pushing said first sealing element adjacent said stem against an end of the service port upon turning said shaft.

2. The device according to claim 1, wherein said detent includes a plurality of locking balls.

3. The device according to claim 1, wherein said first and second sealing elements are disk-shaped washers, and said stem has an opening facing said coupler and receiving said first sealing element.

4. The device according to claim 3, wherein said stem has a T-shaped cross section and a surface against which said free end of said shaft abuts, said surface having a smaller diameter than said opening.

5. The device according to claim 1, which further comprises a stem spring disposed between said head and said second sealing element.

6. The device according to claim 1, wherein said main body is partially disposed within said coupler, said main body has a shoulder, said coupler has a shoulder, and a coupler spring surrounds part of said main body and is biased between said shoulder of said coupler and said shoulder of said main body permitting said coupler to act as a quick coupler with the service port.

7. The device according to claim 3, which further comprises at least one O-ring engaged in a groove formed in said opening of said stem for sealing against an outer surface of the service port.

8. The device according to claim 1, wherein said coupler has a color identifying the device for use only on a low-pressure or high-pressure service port.

9. The device according to claim 1, wherein said first sealing element is a cup, and said stem has an opening facing said coupler and receiving said cup.

10. The device according to claim 9, wherein said stem has a T-shaped cross section.

11. The device according to claim 1, wherein said main body has an inner surface with a step formed therein defining a stop preventing said stem from sliding beyond a predetermined distance in said main body toward said port.

12. The device according to claim 1, wherein said head is screwed to said main body.

13. The device according to claim 1, wherein said end of said shaft having said recess is substantially flush with an end surface of said head when said shaft is sufficiently tightened to preventing refrigerant leaks.

* * * * *